United States Patent
Guerin et al.

(10) Patent No.: US 6,902,610 B2
(45) Date of Patent: Jun. 7, 2005

(54) REDUCED-PETROLEUM-DISTILLATE MIXING GRADE EMULSIONS AND METHODS

(75) Inventors: Michael N. Guerin, Manlius, NY (US); Larry F. Ostermeyer, West Lafayette, IN (US); Michele L. Gardner, Cortland, NY (US); Gary L. Foux, Cortland, NY (US); Gregory A. Harder, Fabius, NY (US)

(73) Assignee: McConnaughay Technologies, a Division of Suit-Kote Corporation, Cortland, NY (US)

( * ) Notice: Subject to any disclaimer, the term of this patent is extended or adjusted under 35 U.S.C. 154(b) by 20 days.

(21) Appl. No.: 10/704,641

(22) Filed: Nov. 12, 2003

(65) Prior Publication Data

US 2005/0098065 A1 May 12, 2005

(51) Int. Cl.⁷ ............................................. C09D 195/00
(52) U.S. Cl. ...................................................... 106/277
(58) Field of Search ......................................... 106/277

(56) References Cited

U.S. PATENT DOCUMENTS

| | | | |
|---|---|---|---|
| 2,620,312 A | * 12/1952 | Manzer | 516/38 |
| 4,362,568 A | 12/1982 | Ostermeyer | 106/232 |
| 4,433,084 A | 2/1984 | Ostermeyer et al. | 524/62 |
| 4,629,511 A | 12/1986 | Vanderzanden | 106/277 |
| 4,676,927 A | 6/1987 | Schilling et al. | 252/311.5 |
| 5,053,080 A | 10/1991 | Gaidis | 106/278 |
| 5,221,703 A | 6/1993 | Ostermeyer | 524/68 |
| 5,336,438 A | 8/1994 | Schilling et al. | 252/311.5 |
| 5,473,000 A | 12/1995 | Pinomaa | 524/59 |

* cited by examiner

*Primary Examiner*—David Brunsman
(74) *Attorney, Agent, or Firm*—Winston & Strawn LLP

(57) ABSTRACT

A medium-setting bituminous composition or mixing grade emulsion for coating aggregates at ambient temperature with reduced levels of petroleum distillates or other solvents. These emulsions are formed from the combination of about 50 weight percent to 75 weight percent asphalt, about 20 weight percent to 40 weight percent water, an inverted emulsion present in an amount sufficient to reduce or eliminate the need for petroleum distillates in forming the emulsion, and an acid component and a base component each of which is present in a type and an amount sufficient to form a salt that facilitates formation of the emulsion. Methods of preparing such emulsions and of paving by adding the inverted emulsion to the asphalt before emulsification, which minimizes foaming thereof, are also included.

20 Claims, No Drawings

REDUCED-PETROLEUM-DISTILLATE MIXING GRADE EMULSIONS AND METHODS

FIELD OF THE INVENTION

This invention relates generally to bituminous emulsions used in the paving industry, and particularly to those used to produce graded and dense graded paving mixtures at ambient temperature using mixtures that are essentially free, or entirely free, of solvents such as petroleum distillates. The emulsions of this invention may be designated as HFMS-2LS, MS-2LS, CMS-2LS, optionally also including polymer blends with an additional "P" designation. Methods of making and using such bituminous emulsions are also included.

BACKGROUND OF THE INVENTION

Prior art asphalt emulsions used to produce graded and dense graded paving mixtures (ASTM D 3628) fall into two classifications: (1) Medium Setting ("MS") (HFMS-2S and CMS-2S, each of which must contain petroleum distillate; and (2) Slow setting ("SS") (SS-1, SS-1H, CSS-1 and CSS-1H. The Medium Setting (MS-types) require the use of significant amounts of petroleum distillate solvents to reduce the viscosity of the emulsion residue to aid in the coating of the aggregate, since the emulsion breaks down early in the mixing process with relatively high surface area aggregates (those containing significant quantities of fine aggregate). This solvent must be of a distillate type to prevent the resulting binder from being too soft to fulfill its intended purpose, that of a bituminous binder for the mixture. These solvents are not only expensive, they are also a waste of energy and detrimental to the environment when they evaporate, which typically can take up to several days or longer. The Slow Setting (SS-types) are required to be very stable so that mixing (dispersion of the emulsion) can take place prior to the emulsion breaking down. These mixtures are susceptible to wash off in times of rain, which is environmentally not acceptable, and construction problems often are caused by the mixture being too tender, since the residue can still be in an emulsified state and not act as the intended bituminous binder.

The Rapid Setting ("RS") type of materials break down much faster than the MS-types, thus they are not suitably used in mixtures, especially graded and dense graded paving mixtures. HFRS-2, though sometimes made with reacted tall oil tall, oil pitch, or tall derivatives) added to the asphalt cement prior to being emulsified, is still a rapid setting emulsion (demulsibility 60% or greater) and will not produce satisfactory mixtures that retain their integrity sufficient to be used for many types of paving applications.

For example, U.S. Pat. No. 4,433,084 discloses a high-float, rapid-setting emulsion of asphalt, tall oil, tall oil derivatives, or mixtures thereof, a copolymer of styrene butadiene styrene and styrene-isoprene-styrene blocks, petroleum distillate, water, and a strong base. These rapid setting materials are disclosed for use primarily in surface treatments such as chip seal coats, as well as penetration treatment of macadam, and as sand seal coats and tack coats to promote adhesion of overlayers.

U.S. Pat. No. 5,221,703 discloses modified asphalt cements including asphalt cement, reacted tall oil, tall oil pitch, tall oil derivatives or mixtures of these, and polymers selected from block copolymers and latexes, both synthetic and natural, as well as methods of manufacturing the same by blending a reacted tall oil-modified asphalt cement with a polymer-modified asphalt cement to obtain the desired properties, modifying an asphalt cement with a reacted tall oil, tall oil pitch, tall oil derivatives or mixture thereof, and then adding the selected polymer(s) to this tall oil-modified asphalt cement, modifying the asphalt cement with the selected polymer(s) and then adding the tall oil, tall oil pitch, tall oil derivatives and mixtures thereof and reacting with a strong base, and, adding the polymer(s), tall oil, tall oil pitch, tall oil derivatives and mixture thereof and the strong base all to the asphalt cement at or nearly at the same time.

U.S. Pat. No. 4,362,568 discloses a petroleum distillate-free or essentially petroleum distillate-free prime coat material for application to absorptive surfaces, such as untreated road or street surfaces, which is designed to penetrate, bond, and stabilize such existing surfaces and to promote adhesion between such surfaces and construction courses that follow. This type of material is also often used as a dust palliative, such as being applied to an untreated surface to control dust.

Thus, it is desired to obtain more environmentally friendly graded and dense graded paving mixtures suitably used in medium setting or slow setting materials that can provide a suitable lifespan to the resultant application, e.g., a road or other paved or coated surface.

SUMMARY OF THE INVENTION

The invention encompasses emulsions, and medium-setting bituminous compositions that include an emulsion, formed from the combination of about 50 weight percent to 75 weight percent asphalt, from about 20 weight percent to 40 weight percent water, an inverted emulsion present in an amount sufficient to reduce or eliminate the need for petroleum distillates in forming the emulsion, and an acid component and a base component, each of which is present in a type and an amount sufficient to form a salt that facilitates formation of the emulsion. In a preferred embodiment, the emulsion is essentially petroleum distillate free, or completely petroleum distillate free. The asphalt is preferably suspended in a mixture of the salt formed from the acid and base components, the water, and the inverted emulsion, and more preferably the asphalt is at least substantially uniformly suspended.

Typically, the petroleum distillate is replaced by the inverted emulsion of the invention, which can include from about 1.5 weight percent to 10 weight percent of a primary mixture of one or more of asphalt, heavy bituminous residual material, gas oil, vegetable oil, or a combination thereof, optionally a petroleum or vegetable distillate in an amount up to about 4 weight percent, optionally from about 0.01 weight percent to 2 weight percent of a second acid component, from about 0.01 weight percent to 2 weight percent of a second base component, and from about 0.1 weight percent to 3 weight percent water, or reaction mixtures thereof. These inverted emulsions are preferably present in an amount of about 2 weight percent to 18 weight percent of the bituminous composition.

In inverted emulsions of the invention that are anionic, a weak acid such as tall oil or tall oil pitch, or a derivative thereof, or mixtures thereof and a strong base such as sodium hydroxide are combined to form the salt, or soap, that is used to form the inverted emulsion along with other components. In cationic inverted emulsions of the invention, a strong acid such as hydrochloric acid and a weak base such as one or more amines are used instead to form the salt.

Independently, a weak acid component such as tall oil or tall oil pitch, or a derivative thereof, or mixtures thereof, and a strong base component such as sodium hydroxide can be used to form the overall emulsion of the invention when combined with water, the inverted emulsion, and asphalt. Alternatively, a strong acid such as hydrochloric acid and a weak base such as one or more amines can be used to help form the overall emulsion.

The invention also relates to graded or dense-graded pavement mixtures formed from the bituminous compositions above. Moreover, the invention encompasses methods of making a medium-setting bituminous paving composition having an emulsion by combining at ambient temperature from about 50% to about 75% asphalt and a sufficient amount of inverted emulsion to reduce or eliminate the need for petroleum distillates in forming the emulsion so as to form a first mixture, and combining the first mixture with treated water formed by combining at least a sufficient amount of acid component and base component to form a salt that facilitates formation of the emulsion when combined with the first mixture and about 20 weight percent to 40 weight percent water.

The invention also encompasses methods of paving, including but not limited to roads; paths such as for biking, running, walking, skating, skateboarding, or blading; athletic grounds such as basketball courts, ball courts, or racetracks; car- or truck-bearing structural bases including campgrounds, picnic grounds, and parking lots; or the like. These methods include applying the bituminous paving composition of the invention under ambient conditions to a surface to be paved, and removing the water and any solvent present therein so as to provide a cured pavement. Preferably, the pavement is sufficiently cured for its intended use, e.g., structurally stable enough to support a car in the case of a road or truck-bearing structural base, under ambient curing conditions of less than about 100° F. within less than about 24 hours.

DETAILED DESCRIPTION OF THE PREFERRED EMBODIMENTS

The emulsions of this invention are Medium Setting, i.e., less than 60 on the emulsibility test; however, instead of using petroleum distillate solvents to reduce the viscosity of the emulsion residue, the viscosity is reduced by incorporating an inverted emulsion into the asphalt cement, or asphalt/polymer blend, preferably prior to it being emulsified. An advantage of the invention includes the ability to reduce the viscosity of the residue without inclusion of significant amounts of petroleum distillate(s), and the invention can preferably provide the ability to add other coating aids efficiently to the residue. The product of evaporation for the emulsions of the invention is primarily water vapor, which is environmentally friendly. Thus, the invention provides bituminous compositions and paving mixtures that cure more rapidly to provide sufficient stability or stiffening to the resultant paved material by minimizing or avoiding the inclusion of solvents.

The invention encompasses a bituminous composition that includes asphalt cement, asphalt-polymer blend, or both (collectively, "asphalt"), water, an inverted emulsion in an amount sufficient to reduce or eliminate the need for petroleum distillates in forming the composition, and acid and base components to help form the composition. These bituminous compositions are medium setting, and are exclusive of rapid setting and slow setting materials per ASTM standards. As a result, the invention provides graded and dense-graded pavement mixtures formed from the bituminous compositions described herein. It should be understood that the asphalt is typically present in powder, particle, or granular form (including agglomerated-type granules). Thus, the bituminous composition contains various components that encapsulate substantially all, or all, of the asphalt so that the encapsulated portion remains suspended to facilitate paving, with the bituminous composition then curing rapidly in place.

The bituminous compositions of the invention are typically obtained by combining a standard emulsion with an inverted emulsion. In one embodiment, which is preferred, an oil-in-water emulsion is formed as the primary, external emulsion. Then water-in-oil emulsion (the inverted emulsion) is formed separately and combined with the oil-in-water primary emulsion. In another embodiment, the water-in-oil emulsion is formed as the primary, external emulsion, and an oil-in-water emulsion (the inverted emulsion) is formed separately and combined with the water-in-oil primary emulsion. The resultant medium setting bituminous compositions are of the cold mixing type, i.e., include one or more emulsions, and they are different from a "coal mix," or hot-heat asphalt mixture. The coal mix formulations are not included within the invention, as they use heat or high temperatures to help reduce or maintain the viscosity sufficiently low to permit suitable coating of the aggregate being coated. Aggregates coated according to the invention may be coarse, fine, or a mixture thereof. The medium setting bituminous compositions of the invention typically cure more rapidly than conventional coal mixes.

The asphalt, or "aggregate," is typically present in an amount from about 50 weight percent to 75 weight percent. Water is typically present in an amount of about 20 weight percent to 40 weight percent water. In one embodiment, the water is present in an amount of about 20 weight percent up to 40 weight percent, preferably about 20 weight percent to less than 40 weight percent. In one preferred embodiment, the water is present in an amount of about 22 to 38 weight percent of the bituminous composition. The water in combination with one or more soaps, i.e., acid and base combinations, helps form the emulsion, inverted emulsion, or both.

The inverted emulsion typically includes a primary mixture of one or more of asphalt, heavy bituminous residual material, gas oil, vegetable oil, or a combination thereof, a second base component that is the same or different from the base component of the bituminous composition as a whole, and water, or reaction mixtures thereof. In one embodiment, the inverted emulsion includes heavy bituminous residual material, gas oil, vegetable oil, or a combination thereof, and preferably contains at least two of these different types of materials. In one more preferred embodiment, the inverted emulsion can include one of each type of heavy bituminous residual material, gas oil, and vegetable oil. As used herein, "heavy bituminous residual material" includes #6 oil and marine oil, or combinations thereof. Particularly suitable gas oils generally include a group of oils recovered from vacuum towers that are also known in the art as "lube streams." Particularly suitable vegetable oils include one or more of alcohols, turpentines, reclaimed cooking oils, or the like, or any combination thereof. Optionally, but preferably, the inverted emulsion further includes petroleum or vegetable distillate in an amount up to about 4 weight percent, and a second acid component that is the same or different from the acid component in the bituminous composition. The sufficient amount of inverted emulsion is typically from about 2 weight percent to 20 weight percent, preferably from about 5 weight percent to 15 weight percent, of the bituminous composition.

In the inverted emulsion, the primary mixture is typically present in an amount from about 1.5 weight percent to 10 weight percent, more preferably from about 1.5 weight percent to 7.5 weight percent. The second base component is typically present in an amount of about 0.01 weight percent to 2 weight percent. The water in the invented emulsion is typically present in an amount of about 0.1 to 3 weight percent, preferably from about 0.1 to 2.5 weight percent, and more preferably from about 0.3 to 0.6 weight percent. In one preferred embodiment, the second base component is a strong base, while in another it is a weak base. Also, the second base component is preferably present in an amount of about 0.01 to 0.5 weight percent, more preferably from about 0.1 weight percent to 2.5 weight percent. In one preferred embodiment, the base is present in an amount of about 0.06 to 0.4 weight percent. The weak base preferably includes one or more amines.

When petroleum or vegetable distillate is included as part of the inverted emulsion, it is typically present in an amount only up to about 4 weight percent, preferably in an amount only up to about 3 weight percent, of the entire bituminous composition. When a second acid component is present, the second acid component is typically present in an amount from about 0.01 weight percent to 2 weight percent, preferably from about 0.05 weight percent to 0.5 weight percent, and more preferably from about 0.2 to 0.5 weight percent. The second acid component, when included, is preferably a strong acid component in one embodiment and preferably a weak acid in another embodiment. The second acid component preferably includes tall oil, tall oil pitch, or a derivative thereof, hydrochloric acid, or any mixture thereof. Typically, when a strong acid component is used, one or more weak bases will be included as the second base component.

The inverted emulsion that is combined with the acid component and base component, or a reaction product thereof, can contain strong acid and weak base components when the acid component is a weak acid and the base component is a strong base. On the other hand, when the acid component is a strong acid and the base component is a weak base, the inverted emulsion can contain weak acid and strong base components.

In one embodiment, the acid and base components in the emulsion of the invention preferably include a weak acid and a strong base to facilitate formation of an anionic emulsion. The acid component is typically present in an amount of about 0.5 weight percent to 6 weight percent to facilitate formation of the anionic emulsion. The base component is typically present in an amount of about 0.05 weight percent to 0.4 weight percent so as to facilitate formation of the anionic emulsion. The tall, tall oil pitch, or derivative thereof, is in one embodiment present in less than 5 weight percent of the bituminous composition.

In another embodiment, the acid and base components in the emulsion preferably include a strong acid and a weak base to facilitate formation of a cationic emulsion. The acid component here is typically present in an amount from about 0.05 weight percent to 0.4 weight percent to facilitate formation of the cationic emulsion. The base component is typically present in an amount from about 0.5 weight percent to 6 weight percent to facilitate formation of the cationic emulsion.

The emulsions of the present invention can be formed by any suitable process available to those of ordinary skill in the art for preparing an emulsion. In particular, a preferred method of making a bituminous paving composition having an emulsion according to the invention is by combining at ambient temperature from about 50% to about 75% asphalt and a sufficient amount of inverted emulsion to reduce or eliminate the need for petroleum distillates in forming the emulsion so as to form a first mixture, combining and milling the first mixture with treated water formed by combining at least a sufficient amount of acid component and base component to facilitate formation of the emulsion when combined with the first mixture with about 20 weight percent to 40 weight percent water, and any other optional components desired. The emulsions are used to provide paving mixtures, such that the invention also includes methods of paving by applying the bituminous paving composition of the invention under ambient conditions to a surface to be paved; and removing the water and any other solvent present therein so as to provide a cured pavement. This removal can occur naturally, e.g., such as by evaporation or runoff, or the removing can be enhanced by any process available to those of ordinary skill in the art for more rapidly curing a pavement, e.g., providing heat or convective air to facilitate evaporation. Preferably, when the ambient conditions are less than about 110° F., the bituminous composition or paving mixture is substantially free of solvent within about 24 hours due to sufficient solvent removal. The rapid curing of the bituminous compositions or paving mixtures of the invention preferably provides a final paved surface that is sufficiently stable to achieve desired load bearing capacities within about 24 hours, more preferably within about 18 hours.

Various embodiments can be envisioned that fall within the scope of the invention, and several exemplary such embodiments are described below. According to one embodiment of the invention, an inverted emulsion made with the same type of emulsifier as the emulsifying soap (e.g., tall oil, tall oil pitch, or tall derivatives) is combined with the asphalt cement, or asphalt/polymer blend, just prior to being emulsified. The amount of inverted emulsion added may vary from about 5% to about 20% based on the weight of the blend, depending on the water content, type and quantity of wetting agent or coating aid if needed, and the aggregate being coated. This blend is then emulsified in accordance with prior art techniques to produce a medium setting emulsion to meet the requirements for ASTM D-977 MS-2, MS-2H HFMS-2 or HFMS-2H. With the inverted emulsion combined with the asphalt cement, or asphalt/polymer blend, the coating property of the emulsion is enhanced with little or no significant effect on the emulsion's other properties.

Coating properties include, but are not limited to, the speed with which coating occurs and the total percent area of substrate that is coated and remains coated. Typically, emulsions and paving mixtures of the present invention coat substrate faster or more completely, preferably both faster and more completely, than conventional medium setting paving mixtures that lack an inverted emulsion according to the invention. Paving mixtures of the invention also surprisingly and unexpected cure faster than comparable medium setting mixtures. Without being bound by theory, it is believe that the reduction or elimination of petroleum distillates in the paving mixtures of the invention advantageously reduce the amount of solvent to be removed upon curing, thereby permitting faster curing than conventional paving mixtures but with little or no loss of coating properties.

According to a second embodiment of the invention, an inverted emulsion made with a different type of agent (a coating aid), rather than the emulsifying soap's tall oil, tall oil pitch, or tall derivatives agent, is combined with the asphalt cement or asphalt/polymer blend just prior to being emulsified. The amount of this inverted emulsion added may vary from about 5% to about 15% based on the weight of the blend, depending on the water content, type and quantity of agent, and the aggregate being coated. This blend is then emulsified in accordance with prior art techniques to produce a medium setting emulsion to meet the requirements for ASTM D-977 MS-2, MS-2H HFMS-2 or HFMS-2H. As above, this inverted emulsion combined with the asphalt cement or asphalt/polymer blend improves the coating properties of the emulsion, with little effect on the emulsion's other properties.

According to a third embodiment of the invention, an inverted emulsion made with the same type of emulsifier as the emulsifying soap (various amines or amine blends) is added to the asphalt cement or asphalt/polymer blend just prior to being emulsified. The amount of inverted emulsion added may vary from about 5% to about 15% based on the weight of the blend, depending on the water content, type and quantity of agent, and the aggregate being coated. This blend is then emulsified in accordance with prior art techniques to produce a cationic medium setting emulsion to meet the requirements for ASTM D-2397 CMS-2 & CMS-2H. Again, with the inverted emulsion in the asphalt cement or asphalt/polymer blend, the coating property of the emulsion is enhanced, with little effect on the emulsion's other properties.

According to a forth embodiment of the invention, an inverted emulsion made with a different type of agent (tall oil, tall oil pitch, or tall derivatives), rather than the emulsifying soap's various amines or amine blends, is added to the asphalt cement or asphalt/polymer blend just prior to being emulsified. The amount of this inverted emulsion added may vary from about 5% to about 20% based on the weight of the blend, depending on the water content, type and quantity of wetting agent or coating aid if present, and the aggregate being coated. This blend is then emulsified in accordance with prior art techniques to produce a cationic medium setting emulsion to meet the requirements for ASTM D-2397 CMS-2 or CMS-2H. As above, this inverted emulsion in the asphalt cement or asphalt/polymer blend does improve the coating property of the emulsion, with little effect on the emulsion's other properties.

The finished emulsions in all four embodiments yield improved coatings of aggregates that are substantially free, or free, of solvents, i.e., petroleum distillate(s). They may also have their residues enhanced by the addition of one or more polymers. These polymers can include, for example: a styrene-butadiene containing-rubber, Neoprene latex, styrene-butadiene, styrene-butadiene-styrene, styrene-isoprene-styrene, ethylene vinyl alcohol, reactive ethylene terpolymer (Elvaloy), and the like, or any combination thereof. The addition method will vary according to the type polymer used, as those of ordinary skill in the art can will know or can readily determine the most suitable techniques required to add a given polymer component. The inclusion of inverted emulsions to replace a portion of petroleum distillates according to the invention imparts little or no effect on the emulsion residue while increasing the coating properties of the emulsions of the invention. Addition of one or more polymers can further increase the coatability or other desirable properties of the emulsions of the invention.

Any embodiment of the invention may include recycled asphalt pavement ("RAP") if desired. The RAP is included in an amount sufficient to avoid a significant reduction in the structural properties of the final mixing grade emulsion and resultant aggregate coating, and preferably in an amount sufficient to avoid any detectable reduction in structural properties.

EXAMPLES

The invention is further defined by reference to the following examples, describing the preparation of the bituminous compositions of the present invention. It will be apparent to those of ordinary skill in the art that many modifications, both to materials and methods, may be practiced without departing from the purpose and interest of this invention. Thus, the following examples are offered by way of illustration, and not by way of limitation, to describe in greater detail the preparation, treatment, and testing of the bituminous compositions and paving mixtures of the invention.

The improved coating properties are demonstrated by the following tests according to the invention:

ASTM D-244 Standard Test Methods and Practices for Emulsified Asphalts—Residue and Oil Distillate by Distillation—This test, also referred to as the "Float" test, is a method to distill an emulsion to determine quantity residue present in the emulsion and the amount of solvent that is light enough to be distilled off at a temperature of 500° F. (260° C.), or 350° F. (176.7° C.) for an emulsion containing a polymer component. The residue from this test is then subjected to other test to evaluate the properties of the residue such as penetration, viscosity, float etc. If the solvent is a light solvent it will be detected in the distillate; however if the solvent is too heavy to be distilled off, it will remain in the residue and change the properties of the residue such as higher penetration and lower viscosity values. This ASTM test provides for two values for grading coatability: an initial value and a value after a boiling test. Thus, all reported coating properties have two values in the tables below.

ASTM D-5 Standard Test Method for Penetration of Bituminous Materials—This test is a method for measuring the consistency of a bituminous material, also known as the "Pen" test. Higher penetration values indicate softer consistency. This means that either softer asphalt cement was used in the emulsification process or a solvent heave enough to remain in the residue is present.

ASTM D-2171 Standard Test Method for Viscosity of Asphalts by Vacuum Capillary Viscometer—The viscosity at 140° F. (60° C.) characterizes flow behavior of the bituminous material. Typically materials that have lower viscosity values are softer than those with higher values are. This can indicate a softer asphalt cement or the presence of solvent.

ASTM D-244 Standard Test Methods and Practices for Emulsified Asphalts—Emulsified Asphalt/Job Aggregate Coating Practice—Typically this practice is used to identify the adequacy of a slow setting grade of emulsion to mix with and coat a dense and fine-graded job aggregate. This practice has been used to identify the adequacy of medium setting emulsions to mix with and coat open graded and dense graded job aggregates so they are less or not susceptible to wash off. Open graded materials have a higher void content than denser materials, which tends to make them easier to coat but can result in reduced long-term stability problems compared to dense graded materials.

The following examples in tables I–III were all formulated as medium setting emulsion. Table I contains the prior art emulsions, both with and without solvent. Table II contains no or reduced solvent medium setting emulsion made in accordance with embodiments I and II. Table III contains no or reduced solvent medium setting emulsion made in accordance with embodiments III and IV.

Table I Examples

P-1 is a prior art medium setting emulsion that contains no solvent. In accordance with ASTM D-977 it would be classified as an HFMS-2. Because it meets the requirements for HFMS-2, it also meets the requirements for MS-2, which is less restrictive. P-1 is 680 grams of PG 58-28 asphalt combined with 320 grams of treated water containing 14 grams of tall oil, tall oil derivatives or combinations thereof and 1.6 grams of sodium hydroxide.

P-2 is a prior art medium setting emulsion that contains solvent. In accordance with ASTM D-977 it would be classified as an HFMS-2. Because it meets the requirements for HFMS-2, it also meets the requirements for MS-2, which is less restrictive. P-2 is 630 grams of PG 64-22 asphalt, 23 ml of light solvent and 47 ml of medium solvent combined with 300 grams of treated water containing 14 grams of tall oil, tall oil derivatives or combinations thereof and 1.6 grams of sodium hydroxide.

P-3 is a prior art cationic medium setting emulsion that contains no solvent. In accordance with ASTM D-2397 it would be classified as a CMS-2. P-3 is 680 grams of PG 58-28 asphalt combined with 320 grams of treated water containing 3.5 grams of an amine blend and 2.8 grams of hydrochloric acid.

P-4 is a prior art cationic medium setting emulsion that contains solvent. In accordance with ASTM D-2397 it would be classified as a CMS-2. P-4 is 634 grams of PG 58-28 asphalt and 86 ml of light solvent combined with 280 grams of treated water containing 2.8 grams of an amine blend and 2.3 grams of hydrochloric acid.

P-5 is a prior art slow setting emulsion that contains no solvent. In accordance with ASTM D-977 it would be classified as an SS-1. P-5 is 640 grams of PG 58-28 asphalt combined with 360 grams of treated water containing 25 grams of a 40% lignin surfactant soap solution and an additional 0.1 gram of sodium hydroxide.

P-6 is a prior art slow setting emulsion that contains no solvent. In accordance with ASTM D-2397 it would be classified as a CSS-1. P-6 is 640 grams of PG 58-28 asphalt combined with 360 grams of treated water containing 12 grams of a non-ionic surfactant, alkoxylated fatty polyamine, amino compound and 2.5 grams of hydrochloric acid.

P-7 is a prior art medium setting emulsion that contains solvent and a polymer. It would be classified as an HFMS-2SP. P-7 is 617.4 grams of PG 64-22 asphalt, 12.6 grams SBS, 23 ml of light solvent and 47 ml of medium solvent combined with 300 grams of treated water containing 14 grams of tall oil, tall oil derivatives or combinations thereof and 1.6 grams of sodium hydroxide.

P-8 is a prior art cationic medium setting emulsion that contains solvent and a polymer. It would be classified as a CMS-2P. P-8 is 621.4 grams of PG 58-28 asphalt and 86 ml of light solvent combined with 280 grams of treated water containing 2.8 grams of an amine blend, 2.3 grams of hydrochloric acid and 20 grams of a cationic styrene-butadiene rubber (SBR) latex.

Table II Examples

I-1 is a medium setting emulsion that contains an inverted emulsion as described in the first embodiment of the invention. This example contains 5% of the inverted emulsion based on the asphalt inverted emulsion blend, which represents the lower side of the suggested range of use. In accordance with ASTM D-977 it would be classified as an HFMS-2. Because it meets the requirements for HFMS-2, it also meets the requirements for MS-2, which is less restrictive. I-1 is 665 grams of PG 58-28 asphalt and 35 grams of an inverted emulsion containing 29.15 grams petroleum residual oil, 2.9 grams of tall oil, tall oil derivatives or combinations thereof, 0.28 grams sodium hydroxide and 2.67 grams of water; all combined with 300 grams of treated water containing 14 grams of tall oil, tall oil derivatives or combinations thereof and 1.6 grams of sodium hydroxide.

I-2 is a medium setting emulsion that contains an inverted emulsion as described in the first embodiment of the invention. This example contains 20% of the inverted emulsion based on the asphalt inverted emulsion blend, which represents the upper side of the suggested range of use. In accordance with ASTM D-977 it would be classified as an HFMS-2. Because it meets the requirements for HFMS-2, it also meets the requirements for MS-2, which is less restrictive. I-2 is 560 grams of PG 58-28 asphalt and 140 grams of an inverted emulsion containing 97.4 grams asphalt, 24.4 ml of medium to heavy solvent, 6.0 grams of tall oil, tall oil derivatives or combinations thereof, 0.6 grams sodium hydroxide and 11.6 grams of water, all combined with 300 grams of treated water containing 14 grams of tall oil, tall oil derivatives or combinations thereof and 1.6 grams of sodium hydroxide.

I-3 is a medium setting emulsion that contains an inverted emulsion as described in the first embodiment of the invention. This example contains 5% of the inverted emulsion based on the asphalt inverted emulsion blend. It meets the requirements for HFMS-2. It also meets the requirements for MS-2, which is a less restrictive requirement. 1-3 is 665 grams of PG 58-28 asphalt and 35 grams of an inverted emulsion containing 14.58 grams asphalt, 14.57 grams gas oil, 2.9 grams of tall oil, tall oil derivatives or combinations thereof, 0.28 grams sodium hydroxide and 2.67 grams of water; all combined with 300 grams of treated water containing 14 grams of tall oil, tall oil derivatives or combinations thereof and 1.6 grams of sodium hydroxide.

I-4 is a medium setting emulsion that contains an inverted emulsion as described in the first embodiment of the invention. This example contains 20% of the inverted emulsion based on the (asphalt/polymer blend) inverted emulsion blend. It would be classified as an HFMS-2LSP. Because it meets the requirements for HFMS-2P, it also meets the requirements for MS-2P, which is less restrictive. 1-4 is 543.2 grams of PG 58-28 asphalt, 16.8 grams of SB+ (a styrene-butadiene block copolymer including a crosslinking agent) and 140 grams of an inverted emulsion containing 97.4 grams asphalt, 24.4 ml of medium to heavy solvent, 6.0 grams of tall oil, tall oil derivatives or combinations thereof, 0.6 grams sodium hydroxide and 11.6 grams of water; all combined with 300 grams of treated water containing 14 grams of tall oil, tall oil derivatives or combinations thereof and 1.6 grams of sodium hydroxide.

I-5 is a medium setting emulsion that contains an inverted emulsion as described in the first embodiment of the invention. This example contains 20% of the inverted emulsion based on the (asphalt/polymer blend) inverted emulsion blend. It would be classified as an HFMS-2LSP. I-5 is 548.8 grams of PG 58-28 asphalt, 11.2 grams of SIS and 140 grams of an inverted emulsion containing 97.4 grams asphalt, 24.4 ml of medium to heavy solvent, 6.0 grams of tall oil, tall oil derivatives or combinations thereof, 0.9 grams potassium hydroxide and 11.6 grams of water; all combined with 300 grams of treated water containing 14 grams of tall oil, tall oil derivatives or combinations thereof and 2.4 grams of potassium hydroxide.

II-1 is a medium setting emulsion that contains an inverted emulsion as described in the second embodiment of the invention. This example contains 5% of the inverted emulsion based on the asphalt inverted emulsion blend, which represents the lower side of the suggested range of use. In accordance with ASTM D-977 it would be classified as an HFMS-2. Because it meets the requirements for HFMS-2, it also meets the requirements for MS-2, which is less restrictive. II-1 is 665 grams of PG 58-28 asphalt and 35 grams of an inverted emulsion containing 19.6 grams asphalt, 8.4 ml of medium to heavy solvent, 4.2 grams of an amine blend, and 2.8 grams of water; all combined with 300 grams of treated water containing 14 grams of tall oil, tall oil derivatives or combinations thereof and 1.6 grams of sodium hydroxide.

II-2 is a medium setting emulsion that contains an inverted emulsion as described in the second embodiment of the invention. This example contains 15% of the inverted emulsion based on the asphalt inverted emulsion blend, which represents the upper side of the suggested range of use. In accordance with ASTM D-977 it would be classified as an HFMS-2. Because it meets the requirements for HFMS-2, it also meets the requirements for MS-2, which is less restrictive. II-2 is 595 grams of PG 58-28 asphalt and 105 grams of an inverted emulsion containing 70.0 grams asphalt, 17.5 ml of medium to heavy solvent, 8.7 grams of an amine blend, and 8.8 grams of water, all combined with 300 grams of treated water containing 14 grams of tall oil, tall oil derivatives or combinations thereof and 1.6 grams of sodium hydroxide.

II-3 is a medium setting emulsion that contains an inverted emulsion as described in the second embodiment of the invention. This example contains 10% of the inverted emulsion based on the asphalt inverted emulsion blend. It meets the requirements for HFMS-2; it also meets the requirements for MS-2, which is less restrictive. II-3 is 630 grams of PG 58-28 asphalt and 70 grams of an inverted emulsion containing 39.2 grams asphalt, 16.8 grams of vegetable oil, 8.4 grams of an amine blend, and 5.6 grams of water; all combined with 300 grams of treated water containing 12.25 grams of tall oil, tall oil derivatives or combinations thereof and 1.4 grams of sodium hydroxide.

II-4 is a medium setting emulsion that contains an inverted emulsion as described in the second embodiment of the invention. This example contains 15% of the inverted emulsion based on the (asphalt/polymer blend) inverted emulsion blend. It would be classified as an HFMS-2LSP. Because it meets the requirements for HFMS-2P, it also meets the requirements for MS-2P, which is less restrictive. II-4 is 580 grams of PG 58-28 asphalt, 15 grams of EVA and 105 grams of an inverted emulsion containing 70.0 grams asphalt, 17.5 ml of medium to heavy solvent, 8.7 grams of an amine blend, and 8.8 grams of water, all combined with 300 grams of treated water containing 14 grams of tall oil, tall oil derivatives or combinations thereof and 1.6 grams of sodium hydroxide.

Table III Examples

III-1 is a medium setting emulsion that contains an inverted emulsion as described in the third embodiment of the invention. This example contains 5% of the inverted emulsion based on the asphalt inverted emulsion blend, which represents the lower side of the suggested range of use. In accordance with ASTM D-2397 it would be classified as a CMS-2. III-1 is 665 grams of PG 58-28 asphalt and 35 grams of an inverted emulsion containing 19.6 grams asphalt, 8.4 ml of medium to heavy solvent, 4.2 grams of an amine blend, and 2.8 grams of water, all combined with 300 grams of treated water containing 3.5 grams of an amine blend and 2.8 grams of hydrochloric acid.

III-2 is a medium setting emulsion that contains an inverted emulsion as described in the third embodiment of the invention. This example contains 15% of the inverted emulsion based on the asphalt inverted emulsion blend, which represents the upper side of the suggested range of use. In accordance with ASTM D-2397 it would be classified as a CMS-2. III-2 is 595 grams of PG 58-28 asphalt and 105 grams of an inverted emulsion containing 70.0 grams asphalt, 17.5 ml of medium to heavy solvent, 8.7 grams of an amine blend, and 8.8 grams of water; all combined with 300 grams of treated water containing 3.5 grams of an amine blend and 2.8 grams of hydrochloric acid.

III-3 is a medium setting emulsion that contains an inverted emulsion as described in the third embodiment of the invention. This example contains 10% of the inverted emulsion based on the asphalt inverted emulsion blend. In accordance with ASTM D-2397 it would be classified as a CMS-2. III-3 is 630 grams of PG 58-28 asphalt and 70 grams of an inverted emulsion containing 39.2 grams asphalt, 16.8 ml of vegetable oil, 8.4 grams of an amine blend, and 5.6 grams of water; all combined with 300 grams of treated water containing 2.8 grams of an amine blend and 2.24 grams of hydrochloric acid.

III-4 is a medium setting emulsion that contains an inverted emulsion as described in the third embodiment of the invention. This example contains 15% of the inverted emulsion based on the (asphalt/polymer blend) inverted emulsion blend. It would be classified as a CMS-2LSP. III-4 is 583 grams of PG 58-28 asphalt, 12 grams of Neoprene (in latex form put in soap water) and 105 grams of an inverted emulsion containing 70.0 grams asphalt, 17.5 ml of medium to heavy solvent, 8.7 grams of an amine blend, and 8.8 grams of water; all combined with 300 grams of treated water containing 3.5 grams of an amine blend and 2.8 grams of hydrochloric acid.

IV-1 is a medium setting emulsion that contains an inverted emulsion as described in the forth embodiment of the invention. This example contains 5% of the inverted emulsion based on the asphalt inverted emulsion blend, which represents the lower side of the suggested range of use. In accordance with ASTM D-2397 it would be classified as a CMS-2. IV-1 is 665 grams of PG 58-28 asphalt and 35 grams of an inverted emulsion containing 20.4 grams asphalt, 8.75 ml of medium to heavy solvent, 2.9 grams of tall oil, tall oil derivatives or combinations thereof, 0.59 grams of an amine and 2.36 grams of water; all combined with 300 grams of treated water containing 3.5 grams of an amine blend and 2.8 grams of hydrochloric acid.

IV-2 is a medium setting emulsion that contains an inverted emulsion as described in the forth embodiment of the invention. This example contains 20% of the inverted emulsion based on the asphalt inverted emulsion blend, which represents the upper side of the suggested range of use. In accordance with ASTM D-2397 it would be classified as a CMS-2. IV-2 is 560 grams of PG 58-28 asphalt and 140 grams of an inverted emulsion containing 97.4 grams asphalt, 24.4 ml of medium to heavy solvent, 6.0 grams of tall oil, tall oil derivatives or combinations thereof, 1.2 grams of an amine base and 12.2 grams of water; all combined with 300 grams of treated water containing 3.5 grams of an amine blend and 2.8 grams of hydrochloric acid.

IV-3 is a medium setting emulsion that contains an inverted emulsion as described in the forth embodiment of the invention. This example contains 5% of the inverted emulsion based on the asphalt inverted emulsion blend. In accordance with ASTM D-2397 it would be classified as a CMS-2. IV-3 is 665 grams of PG 58-28 asphalt and 35 grams of an inverted emulsion containing 14.58 grams asphalt, 14.57 grams of gas oil, 2.9 grams of tall oil, tall oil derivatives or combinations thereof, 0.59 grams of an amine grams of an amine base and 12.2 grams of water; all combined with 300 grams of treated water containing 3.5 grams of an amine blend and 2.8 grams of hydrochloric acid.

TABLE I

Prior Art Emulsions

| Example Number | Grade | % Residue from distillation | % Oil from distillation | Pen (deci-mm) @ 77° F. | Viscosity @ 140° F. | Float (sec.) @ 140° F. | Coating-Open Graded | Coating-Graded | Coating-Dense Graded | Coating-80% RAP 20% agg. |
|---|---|---|---|---|---|---|---|---|---|---|
| P-1 | HFMS-2 | 68.3 | 0 | 116 | 3282 | 1200+ | good/good | fair/fair | poor/poor | poor/poor |
| P-2 | HFMS-2s | 67.1 | 2.5 | 240 | 1235 | 1200+ | good/good | fair/fair | fair/fair | fair/fair |
| P-3 | CMS-2 | 67.8 | 0 | 146 | 492 | | good/good | fair/fair | poor/poor | poor/poor |
| P-4 | CMS-2s | 65.4 | 6.4 | 220 | 256 | | good/good | fair/fair | fair/fair | fair/fair |
| P-5 | SS-1 | 63.9 | 0 | 142 | 517 | | good/poor | good/poor | good/poor | good/poor |
| P-6 | CSS-1 | 63.7 | 0 | 151 | 479 | | good/poor | good/poor | good/poor | good/poor |
| P-7 | HFMS-2SP | 68.2 | 2 | 198 | 1678 | 1200+ | good/good | fair/fair | fair/fair | fair/fair |
| P-8 | CMS-2P | 65.6 | 6.5 | 205 | 989 | | good/good | fair/fair | fair/fair | fair/fair |

TABLE II

Examples of Embodiments 1 & 2 Emulsions

| Example Number | Grade | % Residue from distillation | % Oil from distillation | Pen @ 77° F. | Viscosity @ 140° F. | Float @ 140° F. | Coating-Open Graded | Coating-Graded | Coating-Dense Graded | Coating-80% RAP 20% agg. |
|---|---|---|---|---|---|---|---|---|---|---|
| I-1 | HFMS-2LS | 69.7 | Trace | 129 | 3189 | 1200+ | good/good | fair/fair | fair/fair | fair/fair |
| I-2 | HFMS-2LS | 68.9 | 0.5 | 124 | 3324 | 1200+ | good/good | fair/fair | fair/fair | fair/fair |
| I-3 | HFMS-2LS | 70.0 | 0 | 117 | 2991 | 1200+ | good/good | fair/fair | fair/fair | fair/fair |
| I-4 | HFMS-2LSP | 69.1 | 0.5 | 101 | 3916 | 1200+ | good/good | fair/fair | fair/fair | fair/fair |
| I-5 | HFMS-2LSP | 69.4 | Trace | 121 | 3074 | 1200+ | good/good | fair/fair | fair/fair | fair/fair |
| II-1 | HFMS-2LS | 69.9 | Trace | 135 | 3028 | 1200+ | good/good | fair/fair | fair/fair | fair/fair |
| II-2 | HFMS-2LS | 68.6 | 1 | 110 | 3309 | 1200+ | good/good | fair/fair | fair/fair | fair/fair |
| II-3 | HFMS-2LS | 69.7 | Trace | 116 | 2634 | 1200+ | good/good | fair/fair | fair/fair | fair/fair |
| II-4 | HFMS-2LSP | 68.3 | Trace | 107 | 3509 | 1200+ | good/good | fair/fair | fair/fair | fair/fair |

TABLE III

Examples of Embodiments 1 & 2 Emulsions

| Example Number | Grade | % Residue from distillation | % Oil from distillation | Pen @ 77° F. | Viscosity @ 140° F. | Float @ 140° F. | Coating-Open Graded | Coating-Graded | Coating-Dense Graded | Coating-80% RAP 20% agg. |
|---|---|---|---|---|---|---|---|---|---|---|
| III-1 | CMS-2LS | 70.1 | Trace | 138 | 470 | | good/good | fair/fair | fair/fair | fair/fair |
| III-2 | CMS-2LS | 69.2 | 0.5 | 120 | 410 | | good/good | fair/fair | fair/fair | fair/fair |
| III-3 | CMS-2LS | 69.7 | Trace | 143 | 377 | | good/good | fair/fair | fair/fair | fair/fair |
| III-4 | CMS-2LSP | 68.4 | 0.5 | 117 | 538 | | good/good | fair/fair | fair/fair | fair/fair |
| IV-1 | CMS-2LS | 70.0 | Trace | 142 | 458 | | good/good | fair/fair | fair/fair | fair/fair |
| IV-2 | CMS-2LS | 69.1 | 0.5 | 125 | 416 | | good/good | fair/fair | fair/fair | fair/fair |
| IV-3 | CMS-2LS | 70.3 | Trace | 136 | 433 | | good/good | fair/fair | fair/fair | fair/fair |
| IV-4 | CMS-2LSP | 69.6 | Trace | 119 | 572 | | good/good | fair/fair | fair/fair | fair/fair | coating quality of the total aggregate surface area by asphalt emulsion as good, fair, or poor as defined in ASTM D-244 Section 76.
Good - fully coated by asphalt emulsion exclusive of pinholes and sharp edges
Fair - an excess of coated area over uncoated area
Poor - an excess of uncoated area over coated area and 2.36 grams of water, all combined with 300 grams of treated water containing 4.2 grams of an amine blend and 3.36 grams of hydrochloric acid.

IV-4 is a medium setting emulsion that contains an inverted emulsion as described in the forth embodiment of the invention. This example contains 20% of the inverted emulsion based on the (asphalt/polymer blend) inverted emulsion blend. It would be classified as a CMS-2LSP. IV-4 is 552 grams of PG 58-28 asphalt, 8 grams of Elvaloy and 140 grams of an inverted emulsion containing 97.4 grams asphalt, 24.4 ml of medium to heavy solvent, 6.0 grams of tall oil, tall oil derivatives or combinations thereof, 1.2

In all cases the emulsions rated fair that had higher levels of solvent (P-2 & P-4) or high levels of inverted emulsion (I-2, II-2, III-2 & IV-2) rated on the higher side of fair (about 80 to 90% or better) as compared to those with lower treatment levels. Thus, these examples demonstrate that the bituminous compositions and resultant paving mixtures of the invention can provide comparable residue properties to conventional medium setting paving mixtures, but are surprisingly and unexpectedly superior in terms of minimizing or avoiding environmental damage and in providing significantly decreased curing times than compared to conventional compositions and mixtures, which include a significant solvent component.

"Weak acid" or "weak acid component," as used herein, refers to one or more acids capable of providing an emulsion when combined in appropriate amounts with a strong base. Preferred weak acids include, but are not limited to, the following: Crude Tall Oil (CTO); Distilled Tall Oil (DTO); Tall Oil Pitch (TOP); Tall Oil Heads (Heads); Tall Oil Fatty Acids (FA); Tall Oil Rosin acids (RA); Black liquor or black liquor soap skimmings; natural thermoplastic resins extracted from pinewood, such as the VINSOL family of resins supplied by Hercules, CRC, and others; lignin; or a derivative thereof; or any combination thereof. More preferably, the weak acid component includes Crude Tall Oil (CTO); Distilled Tall Oil (DTO); Tall Oil Pitch (TOP); or any combination thereof. After reaction with a strong base, the resulting soap has a pH of at least about 9.

"Strong acid" or "strong acid component," as used herein, refers to one or more acids that are capable of providing an emulsion when combined in appropriate amounts with a weak base. Strong acids, when reacted with a weak base, provide a soap having a pH of no greater than about 5, preferably from about 1 to 4.5. Preferably, the strong acid includes hydrochloric acid.

"Strong base" or "strong base component," as used herein, refers to one or more bases that are capable of providing an emulsion when combined in appropriate amounts with a weak acid. After reaction with a weak acid, these soap emulsions have a pH of at least about 9, Generally, the strong base includes one or more hydroxides, particularly sodium hydroxide, potassium hydroxide, or a combination thereof. The strong base more preferably includes sodium hydroxide.

"Weak base" or "weak base component," as used herein, refers to one or more bases that are capable of providing an emulsion when combined in appropriate amounts with a strong acid. When reacted with a strong acid, the resulting soap typically has a pH of no more than about 5 as previously noted, Generally, the weak base includes an amine-based component of one or more amine-containing compounds, and a variety of suitable possibilities exist. Preferably, the weak base includes tallow diamine, triamine, tetramine, one or more primary amines, a vegetable amine, or a combination thereof. Preferably, the vegetable amines include soybean, tall oil, or the like.

"Essentially free" or "substantially free," as used herein, refers to no more than about 10 weight percent, preferably no more than about 5 weight percent, and more preferably no more than about 1 weight percent, based on the total weight of the bituminous composition, of petroleum distillate or mixtures thereof are present. In one preferred embodiment, "essentially free" refers to less than about 0.5 weight percent, while in another it refers to less than about 0.1 weight percent of such petroleum distillate or mixtures thereof are present in the bituminous composition. "Completely free" means that no more than a trace detectable amount of petroleum distillate is present, and preferably no detectable petroleum distillate is present in the bituminous composition. "Substantially all" can be used as a corollary term to "substantially free," such that if the bituminous composition or paving mixture is substantially free of solvent, then the composition or mixture has had substantially all of the solvent removed.

The term "substantially all suspended," as used herein, refers to a predominant amount of asphalt being suspended or encapsulated in the bituminous compositions, preferably at least about 90 weight percent, more preferably at least about 95 weight percent. In a preferred embodiment, at least about 99 weight percent of the asphalt is suspended or encapsulated.

The term "about," as used herein, should generally be understood to refer to both numbers in a range of numerals. Moreover, all numerical ranges herein should be understood to include each whole integer within the range.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions herein without departing from the methods and compositions disclosed and taught by the present invention.

What is claimed is:

1. A medium-setting bituminous composition comprising an emulsion formed from the combination of:
   from about 50 weight percent to 75 weight percent asphalt;
   from about 20 weight percent to 40 weight percent water;
   an inverted emulsion present in an amount sufficient to reduce or eliminate the need for petroleum distillates in forming the emulsion; and
   an acid component and a base component, each of which is present in a type and an amount sufficient to form a salt that facilitates formation of the emulsion.

2. The bituminous composition of claim 1, wherein the emulsion is essentially petroleum distillate free.

3. The bituminous composition of claim 1, wherein the inverted emulsion comprises:
   from about 1.5 weight percent to 10 weight percent of a primary mixture of one or more of asphalt, a heavy bituminous residual material, a gas oil, a vegetable oil, or a combination thereof;
   optionally, petroleum or vegetable distillate in an amount up to about 4 weight percent;
   optionally, from about 0.01 weight percent to 2 weight percent of a second acid component;
   from about 0.01 weight percent to 2 weight percent of a second base component; and
   from about 0.1 weight percent to 3 weight percent water, or reaction mixtures thereof.

4. The bituminous composition of claim 3, wherein the second acid component is a weak acid component present in an amount of about 0.1 weight percent to 2 weight percent of the bituminous composition and the second base component is a strong base component present in an amount of about 0.01 weight percent to 0.3 weight percent of the bituminous composition.

5. The bituminous composition of claim 4, wherein the weak acid comprises tall oil or tall oil pitch, or a derivative thereof, or mixtures thereof and the strong base comprises sodium hydroxide.

6. The bituminous composition of claim 3, wherein the second acid component is a strong acid component present in an amount of about 0.01 weight percent to 0.3 weight percent of the bituminous composition and the second base component is a weak base component present in an amount of about 0.1 weight percent to 2 weight percent of the bituminous composition.

7. The bituminous composition of claim 6, wherein the strong acid comprises hydrochloric acid and the weak base comprises one or more amines.

8. The bituminous composition of claim 3, wherein the inverted emulsion comprises, by weight of the final emulsion, a combination of about 1.5 weight percent to 7.5 weight percent of a combination of one or more of asphalt or heavy bituminous residuals, up to about 3 weight percent distillates of petroleum or vegetable, about 0.1 weight percent to 2.5 weight percent of one or more amines, and about 0.1 weight percent to 2.5 weight percent water.

9. The bituminous composition of claim 3, wherein the second base component comprises from about 0.3 weight percent to 0.6 weight percent of one or more amines and the second acid component is present and comprises from about 0.2 weight percent to 0.5 weight percent hydrochloric acid.

10. The bituminous composition of claim 3, wherein the second acid component comprises from about 0.1 weight percent to 2.0 weight percent tall oil or tall oil pitch, or a derivative thereof, the second base component comprises from about 0.06 weight percent to 0.4 weight percent amine base and about 0.1 weight percent to 3 weight percent water.

11. The bituminous composition of claim 1, wherein the sufficient amount of inverted emulsion is from about 2 weight percent to 18 weight percent of the bituminous composition.

12. The bituminous composition of claim 1, wherein the sufficient amount of acid component is a weak acid present in an amount from about 0.5 weight percent to 6 weight percent and the sufficient amount of base component is a strong base present in an amount from about 0.05 weight percent to 0.4 weight percent so as to provide an anionic emulsion.

13. The bituminous composition of claim 12, wherein the weak acid component comprises tall oil or tall oil pitch, or a derivative thereof, or mixtures thereof and the strong base component comprises sodium hydroxide.

14. The bituminous composition of claim 1, wherein the sufficient amount of acid component is a strong acid present in an amount from about 0.05 weight percent to 0.4 weight percent and the sufficient amount of base component is a weak base present in an amount from about 0.5 weight percent to 6 weight percent as to provide a cationic emulsion.

15. The bituminous composition of claim 14, wherein the strong acid comprises hydrochloric acid and the weak base comprises one or more amines.

16. The bituminous composition of claim 1, wherein the asphalt is suspended in the inverted emulsion and also the salt formed from the acid and base components and the water.

17. A graded or dense-graded pavement mixture formed from the bituminous composition of claim 1.

18. A method of making a medium-setting bituminous paving composition having an emulsion which comprises:
  combining at ambient temperature from about 50% to about 75% asphalt and a sufficient amount of inverted emulsion to reduce or eliminate the need for petroleum distillates in forming the emulsion so as to form a first mixture; and
  combining the first mixture with treated water formed by combining at least a sufficient amount of acid component and base component to form a salt that facilitates formation of the emulsion when combined with the first mixture and about 20 weight percent to 40 weight percent water.

19. A method of paving which comprises:
  applying the bituminous paving composition of claim 18 under ambient conditions to a surface to be paved; and
  removing the water and any solvent present therein so as to provide a cured pavement.

20. The method of claim 19, wherein the paving composition is sufficiently cured under ambient curing conditions of less than about 110° F. for load bearing use within less than about 24 hours.

* * * * *